United States Patent [19]

Rohsler

[11] 3,973,176

[45] Aug. 3, 1976

[54] CONTROL CIRCUITS FOR ELECTRICALLY DRIVEN VEHICLES

[75] Inventor: Ivor Carl Rohsler, Birmingham, England

[73] Assignee: Joseph Lucas (Industries) Limited, Birmingham, England

[22] Filed: June 5, 1974

[21] Appl. No.: 476,557

[30] Foreign Application Priority Data
June 6, 1973 United Kingdom............... 27009/73

[52] U.S. Cl................................ 318/269; 318/139; 318/341; 318/345
[51] Int. Cl.²......................................... H02P 5/12
[58] Field of Search ............ 318/345, 341, 139, 269

[56] References Cited
UNITED STATES PATENTS

| | | | |
|---|---|---|---|
| 3,660,738 | 5/1972 | Anderson et al. ............... | 318/345 X |
| 3,761,793 | 9/1973 | Naito ............................... | 318/345 X |
| 3,777,237 | 12/1973 | Anderson......................... | 318/345 X |
| 3,784,890 | 1/1974 | Geiersbach...................... | 318/345 |
| 3,826,959 | 6/1973 | Anderson......................... | 318/345 X |

FOREIGN PATENTS OR APPLICATIONS

| | | | |
|---|---|---|---|
| 2,013,745 | 4/1970 | France............................. | 318/345 |
| 2,022,745 | 8/1970 | France............................. | 318/345 |

*Primary Examiner*—B. Dobeck
*Attorney, Agent, or Firm*—Holman & Stern

[57] ABSTRACT

In an electrically driven vehicle which is controlled by a thyristor chopper circuit having a main thyristor in series with the traction motor and a commutating thyristor for turning the main thyristor off, demand means is provided for setting a required current through the motor and firing the commutating thyristor when the required current is attained. An overriding control permits firing of the commutating thyristor when the main thyristor has been on for a predetermined period, and timing means operates when the overriding control is operative for setting the minimum off period of the main thyristor.

1 Claim, 1 Drawing Figure

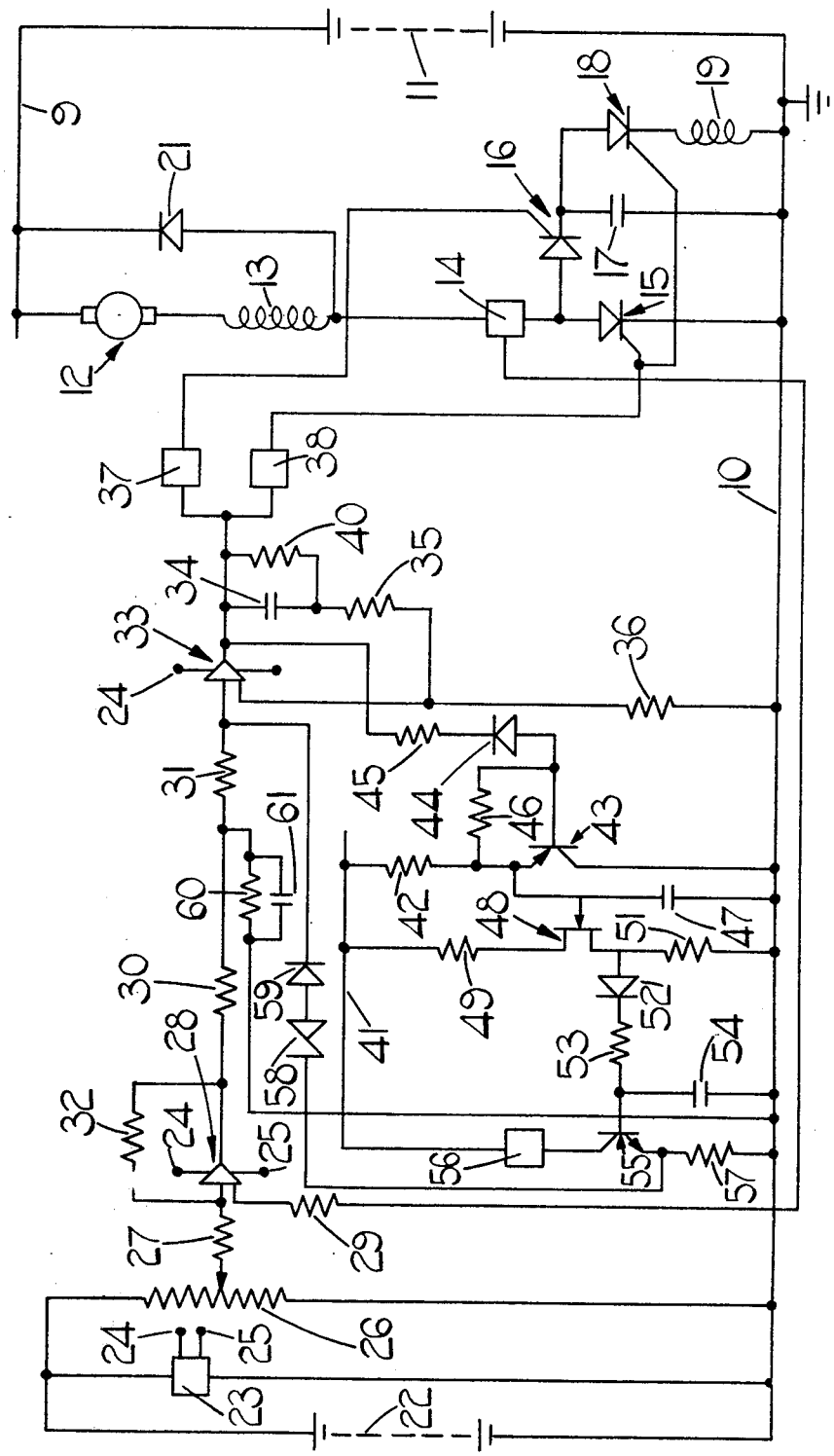

CONTROL CIRCUITS FOR ELECTRICALLY DRIVEN VEHICLES

This invention relates to control circuits for electrically driven vehicles.

A control circuit according to the invention comprises in combination a traction motor driving the vehicle, a thyristor chopper circuit controlling the speed of the traction motor, said chopper circuit including a main thyristor in series with the motor, and a commutating thyristor which when fired turns off the main thyristor, demand means controlling the instants of firing of the thyristors to regulate the mean current flow in the motor, said demand means setting a required current through said motor and firing the commutating thyristor when said required current is attained, an overriding control permitting firing of said commutating thyristor when the main thyristor has been on for a predetermined period, and timing means operable when the overriding control is operative for setting the minimum off period of the main thyristor.

Preferably, means is provided for setting the minimum on and off periods of the main thyristor, and said timing means serves when the overriding control is operative to increase the normal minimum off period.

Preferably, the timing means operates to increase the normal minimum off period only when the motor is being used to provide electrical braking.

The accompanying drawing is a circuit diagram illustrating one example of the invention.

Referring to the drawing, a vehicle includes a traction battery 11, typically at a voltage in excess of 200 volts, and having its positive terminal connected to a supply line 9 and its negative terminal connected to a supply line 10. Connected in series between the lines 9, 10 are the armature 12 of a traction motor, the field winding 13 of a motor, a current sensing device 14 and the anode-cathode path of a thyristor 15. The anode of the thyristor 15 is connected to the line 10 through the anode-cathode path of a thyristor 16 and the capacitor 17 in series, whilst the junction of the thyristor 16 and capacitor 17 is connected to the line 10 through the anode-cathode path of a thyristor 18 and an inductor 19.

The vehicle further includes a battery 22, typically at 24 volts, with its negative terminal connected to the line 10. Connected across the battery 22 is a power supply circuit 23 which provides low voltage power to various parts of the circuit, and in particular provides power to positive and negative terminals 24, 25, which typically are at plus and minus 15 volts respectively. Also connected across the battery 22 is a resistor 26, having movable thereon a slider which is linked to the accelerator pedal of the vehicle. The slider is connected through a resistor 27 to the inverting input terminal of an operational amplifier 28, connected between the terminals 24, 25. The current sensing device 14 provides an input by way of a resistor 29 to the non-inverting input terminal of the amplifier 28.

The circuit further includes a second operational amplifier 33 connected between the terminals 24, 25, and having its non-inverting input terminal connected to the line 10 through a resistor 36, and its inverting input terminal connected to the output of the amplifier 28 through resistors 31, 30 in series. The junction of the resistors 31, 30 is connected to the line 10 through a resistor 60 and capacitor 61 in parallel and the output and inverting input terminals of the amplifier 28 are coupled through a resistor 32. The output terminal of the amplifier 33 is connected to its non-inverting input terminal through a series circuit including a capacitor 34 and a resistor 35 the capacitor 34 being bridged by a resistor 40. The output terminal of the amplifier 33 is connected to a pair of drive circuit 37 and 38, the circuit 37 being coupled to the gate of the thyristor 16 and the circuit 38 being coupled to the gates of the thyristors 15 and 18.

It is convenient for the moment to consider the operation of the arrangement thus far described, neglecting the other components shown in the drawing. Considering first the operation of the chopper circuit for controlling the motor, consider a point in the cycle at which the thyristor 15 is off and the thyristor 16 is on, so that the capacitor 17 charges by way of the thyristor 16, after which the thyristor 16 turns off. At a later point in the cycle the thyristor 15 is fired so that current flows in the motor, and at the same time the thyristor 18 is fired to reverse the charge on the capacitor 17. After the capacitor has reversed, the thyristor 18 turns off, and at a later point in the cycle the thyristor 16 is fired again so that the capacitor 17 discharges through the thyristor 15 to turn off the thyristor 15, after which the capacitor 17 starts to charge again and the cycle is repeated.

The arrangement of the control circuit for the thyristors is such that when the current flowing in the motor is increasing, the thyristor 16 is fired at a first predetermined current to turn off the thyristor 15, so that the current flow in the motor then reduces. At a second and lower predetermined current, the thyristors 15 and 18 are fired. A current which is intermediate the first and second predetermined currents is set by the slider movable over the resistor 26, and the operational amplifier 28 compares this set current with the actual current which is detected by the device 14. If the desired current is greater than the actual current, then the amplifier 28 produces a positive output, but if the desired current is less than the actual current, the amplifier 28 produces a negative output. The output from the amplifier 28 is fed to the operational amplifier 33. Thus, suppose that the current flow in the motor 12 is increasing, then the amplifier 33 receives a positive input. When the actual current becomes equal to the desired current, the output from the amplifier 28 changes in polarity, and so the input to the amplifier 33 becomes negative. The result of this is that a negative pulse is produced by the amplifier 33, this negative pulse operating the circuit 37 to turn on the thyristor 16.

At a later point in the cycle, the current sensed by the device 14 falls below the demanded current, and the polarity of the output from the amplifiers 28 changes, so that the amplifier 33 produces a positive going pulse, which operates the circuit 38 to fire the thyristors 15 and 18. However, because of the feedback circuit by way of the capacitor 34 and resistor 35, the amplifier 33 can only change state after a predetermined delay, this delay being determined by the capacitor 34. As a result, each of the thyristors 15 and 16 will remain on for a predetermined period of time which is chosen to be sufficiently long to ensure that the chopper circuit will operate satisfactorily. If, during the delay period, the input at the inverting input terminal of the amplifier 33 changes, the amplifier 33 will ignore this change, because the potential at its non-inverting input terminal is determined by the capacitor 34. At the end of the delay period, when the potential at the non-inverting input terminal of the amplifier 33 is fed by the resistor 36, the amplifier 33 will assume one of its stable conditions, in accordance with the signal on its inverting input terminal at that time.

In addition to ensuring that the chopper circuit operates satisfactorily, the delay produced by the capacitor 34 has the advantage that any transients produced during switching in the chopper circuit cannot have any effect on the operation of the circuit.

The connections of the motor 12 and field winding 13 the supply lines will of course be made by way of contactors in the usual way, and the contactors are so arranged that the motor can drive the vehicle in a forward direction or a reverse direction. In addition, the contactors are capable of connecting the motor in the circuit so that it provides electrical braking. Conveniently, the contactors are controlled for this purpose by the brake pedal of the vehicle.

It will be understood that the circuit thus far described effectively controls the minimum on time and the minimum off time of the main thyristor 15. The remaining components are provided so that two further desirable features of the arrangement are obtained. Firstly, it is possible in some circumstances that the current set by the slider movable over the resistor 26 will never be reached, and in these circumstances the thyristor 15 would not of course be turned off. Moreover, it is desirable during electrical braking to increase the minimum off period.

The remaining components are connected between the line 10 and a supply line 41 which is connected to the terminal 24. The line 41 is connected through a resistor 42 to the emitter of a p-n-p transistor 43 having its collector connected to the line 10, the base of the transistor 43 being connected to its emitter through a resistor 46, and further being connected through a diode 44 and a resistor 45 in series to the output terminal of the amplifier 33. The emitter of the transistor 43 is connected to the line 10 through a capacitor 47, and is also connected to the emitter of a uni-junction transistor 48 the primary and secondary bases of which are connected through resistors 49, 51 respectively to the lines 41, 10. The secondary base of the transistor 48 is also connected to the line 10 through a diode 52, a resistor 53 and a capacitor 54 in series, and the junction of the resistor 53 and capacitor 54 is connected to the base of an n-p-n transistor 55, the emitter of which is connected through a resistor 57 to the line 10, and through a Zener diode 58 and a diode 59 in series to the inverting input terminal of the amplifier 33. The collector of the transistor 55 is connected through a device 56 operable by the brake pedal of the vehicle to the line 41.

When the brakes of the vehicle are not applied, the collector of the transistor 55 is effectively disconnected from the line 41, and so the transistor 55 can be regarded as a diode. In these circumstances, the purpose of the circuit is to turn the thyristor 15 off after a predetermined period of time, that is to say to set a maximum on time for the thyristor 15.

Immediately before the thyristor 15 is fired, the output from the amplifier 33 is negative, and current flows through the resistor 42 and the emitter-base of the transistor 43 thence by way of the diode 44 and resistor 45 to the output terminal of the amplifier 33, so that the transistor 43 is on and the capacitor 47 is discharged. However, when the output from the amplifier 33 changes state to turn the thyristor 15, the transistor 43 will be turned off and so the capacitor 47 will start to charge. After a predetermined delay, the uni-junction transistor 48 conducts, the capacitor 54 charges and pulse is applied by way of the base-emitter diode of the transistor 55 to the inverting input terminal of the amplifier 33. This pulse will have the same effect on the amplifier 33 as a pulse received from the amplifier 28 and so the thyristor 16 will be fired to turn the thyristor 15 off. As soon as the amplifier 33 changes state to turn the thyristor 15 off, the transistor 44 will be turned on again and the capacitor 47 will discharge. Thus, if the current in the device 14 does not rise to the predetermined level within the predetermined period of time, the thyristor 15 will be turned off by the circuit connected between the lines 41, 10. It should be noted that if the current does rise to the predetermined level, so that the amplifier 33 changes state, then the transistor 43 will be turned on and no pulse will be produced by the transistor 48.

The other feature of the arrangement is that if during braking the current flow in the thyristor 15 fails to reach the level set by the slider movable over the resistor 26, so that the amplifier 33 has its state changed by a pulse derived by the transistor 48 then in these circumstances it is advisable to increase the minimum off period of the thyristor 15. With the arrangement so far described, then if the amplifier 33 is caused to change state by the transistor 48, the minimum off period will be determined by the capacitor 34 and its associated components. However, if this series of events occurs during electrical braking, then the device 56 will couple the collector of the transistor 55 to the line 51, so that the transistor 55 acts as an emitter follower, and effectively the pulse fed to the amplifier 33 is increased in length. The leading edge of the pulse will cause the thyristor 15 to turn off as described above, but bearing in mind that the timing effected by the capacitor 34 and its associated components commences only after the pulse at the inverting input terminal of the amplifier 33 terminates, it will be appreciated that since this pulse has now been elongated, then effectively the minimum off time of the thyristor 15 has been increased by the length of the input pulse to the amplifier 33.

I claim:

1. A control circuit for an electrically driven vehicle comprising in combination a traction motor driving the vehicle, a thyristor chopper circuit controlling the speed of the traction motor, said chopper circuit including a main thyristor in series with the motor, and a commutating thyristor which when fired turns off the main thyristor, demand means controlling the instants of firing of the thyristors to regulate the mean current flow in the motor, said demand means setting a required current through said motor and firing the commutating thyristor when said required current is attained, said demand means including brake selection means arranged to operate the motor in a braking mode as well as in a normal drive mode, an overriding control permitting firing of said commutating thyristor when the main thyristor has been on for a predetermined time, timing means operable when the overriding control is operative for setting the minimum off period of the main thyristor, said timing means serving when the overriding control is operative to increase the normal minimum off period of said main thyristor, means for setting the normal minimum on and off period of the main thyristor, said timing means operating to increase the normal minimum off period only when the motor is being used to provide electrical braking.

* * * * *